United States Patent
Lincourt, Jr. et al.

(10) Patent No.: US 12,235,857 B2
(45) Date of Patent: Feb. 25, 2025

(54) INSIGHT CREATION TRANSPARENCY

(71) Applicant: Dell Products L.P., Round Rock, TX (US)

(72) Inventors: Robert Anthony Lincourt, Jr., Franklin, MA (US); Eloy Francisco Macha, Crowley, TX (US); Stephen James Todd, North Andover, MA (US)

(73) Assignee: Dell Products L.P., Round Rock, TX (US)

( * ) Notice: Subject to any disclaimer, the term of this patent is extended or adjusted under 35 U.S.C. 154(b) by 124 days.

(21) Appl. No.: 18/162,246

(22) Filed: Jan. 31, 2023

(65) Prior Publication Data

US 2024/0256559 A1    Aug. 1, 2024

(51) Int. Cl.
*G06F 16/24* (2019.01)
*G06F 16/2458* (2019.01)
*G06F 16/28* (2019.01)

(52) U.S. Cl.
CPC ........ *G06F 16/2465* (2019.01); *G06F 16/285* (2019.01)

(58) Field of Classification Search
CPC . G06F 16/2465; G06F 16/285; G06F 16/9024
See application file for complete search history.

(56) References Cited

U.S. PATENT DOCUMENTS

| | | | |
|---|---|---|---|
| 2005/0038533 A1* | 2/2005 | Farrell ................ | G06F 16/9024 707/E17.011 |
| 2021/0173711 A1* | 6/2021 | Crabtree ............. | G06F 16/9024 |
| 2021/0342125 A1* | 11/2021 | Burnett ................ | G06F 8/34 |
| 2023/0216967 A1* | 7/2023 | Murali ................. | H04M 15/00 455/406 |
| 2023/0367794 A1* | 11/2023 | Treynor ............... | G06F 16/288 |

* cited by examiner

*Primary Examiner* — Kavita Stanley
*Assistant Examiner* — Cecile H Vo
(74) *Attorney, Agent, or Firm* — Chamberlain, Hrdlicka, White, Williams & Aughtry; Aly Z. Dossa

(57) ABSTRACT

A method and system for insight creation transparency. Explainable artificial intelligence, in recent years, has become synonymous with a framework through which users, relying on machine learning models for various applications, may come to trust the result(s) outputted by said models through better comprehension of the mechanisms leading to said result(s). Leveraging a vast database of metadata for a plethora of unstructured and structured data/information, embodiments disclosed herein derive, or infer, insights therefrom that best address any user-submitted queries. Embodiments disclosed herein, further, provide transparency information detailing, for example, which input(s) and which technique(s) and/or algorithm(s) were employed to arrive at the derived/inferred insights.

14 Claims, 10 Drawing Sheets

INSIGHT CREATION TRANSPARENCY

BACKGROUND

Organization strategy may reference a plan (or a sum of actions), intended to be pursued by an organization, directed to leveraging organization resources towards achieving one or more long-term goals. Said long-term goal(s) may, for example, relate to identifying or predicting future or emergent trends across one or more industries. Digitally-assisted organization strategy, meanwhile, references the scheming and/or implementation of organization strategy, at least in part, through insights distilled by artificial intelligence.

SUMMARY

In general, in one aspect, embodiments disclosed herein relate to a method for insight creation transparency. The method includes: receiving a transparent insight query including a query expression; extracting an expression keyword from the query expression; obtaining a metadata graph representative of an asset catalog; filtering, based on the expression keyword, the metadata graph to identify a node subset; generating a k-partite metadata graph using the node subset; and creating a non-interactive query result based on the k-partite metadata graph.

In general, in one aspect, embodiments disclosed herein relate to a non-transitory computer readable medium (CRM). The non-transitory CRM includes computer readable program code, which when executed by a computer processor, enables the computer processor to perform a method for insight creation transparency. The method includes: receiving a transparent insight query including a query expression; extracting an expression keyword from the query expression; obtaining a metadata graph representative of an asset catalog; filtering, based on the expression keyword, the metadata graph to identify a node subset; generating a k-partite metadata graph using the node subset; and creating a non-interactive query result based on the k-partite metadata graph.

In general, in one aspect, embodiments disclosed herein relate to a system. The system includes: a client device; and an insight service operatively connected to the client device, and including a computer processor configured to perform a method for insight creation transparency. The method includes: receiving, from the client device, a transparent insight query including a query expression; extracting an expression keyword from the query expression; obtaining a metadata graph representative of an asset catalog; filtering, based on the expression keyword, the metadata graph to identify a node subset; generating a k-partite metadata graph using the node subset; and creating a non-interactive query result based on the k-partite metadata graph.

Other aspects disclosed herein will be apparent from the following description and the appended claims.

DETAILED DESCRIPTION

Specific embodiments disclosed herein will now be described in detail with reference to the accompanying figures. In the following detailed description of the embodiments disclosed herein, numerous specific details are set forth in order to provide a more thorough understanding disclosed herein. However, it will be apparent to one of ordinary skill in the art that the embodiments disclosed herein may be practiced without these specific details. In other instances, well-known features have not been described in detail to avoid unnecessarily complicating the description.

In the following description of FIGS. 1A-5, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments disclosed herein relate to insight creation transparency. Explainable artificial intelligence, in recent years, has become synonymous with a framework through which users, relying on machine learning models for various applications, may come to trust the result(s) outputted by said models through better comprehension of the mechanisms leading to said result(s). Leveraging a vast database of metadata for a plethora of unstructured and structured data/information, embodiments disclosed herein derive, or infer, insights therefrom that best address any user-submitted queries. Embodiments disclosed herein, further, provide transparency information detailing, for example, which input(s) and which technique(s) and/or algorithm(s) were employed to arrive at the derived/inferred insights.

Figure 1A:
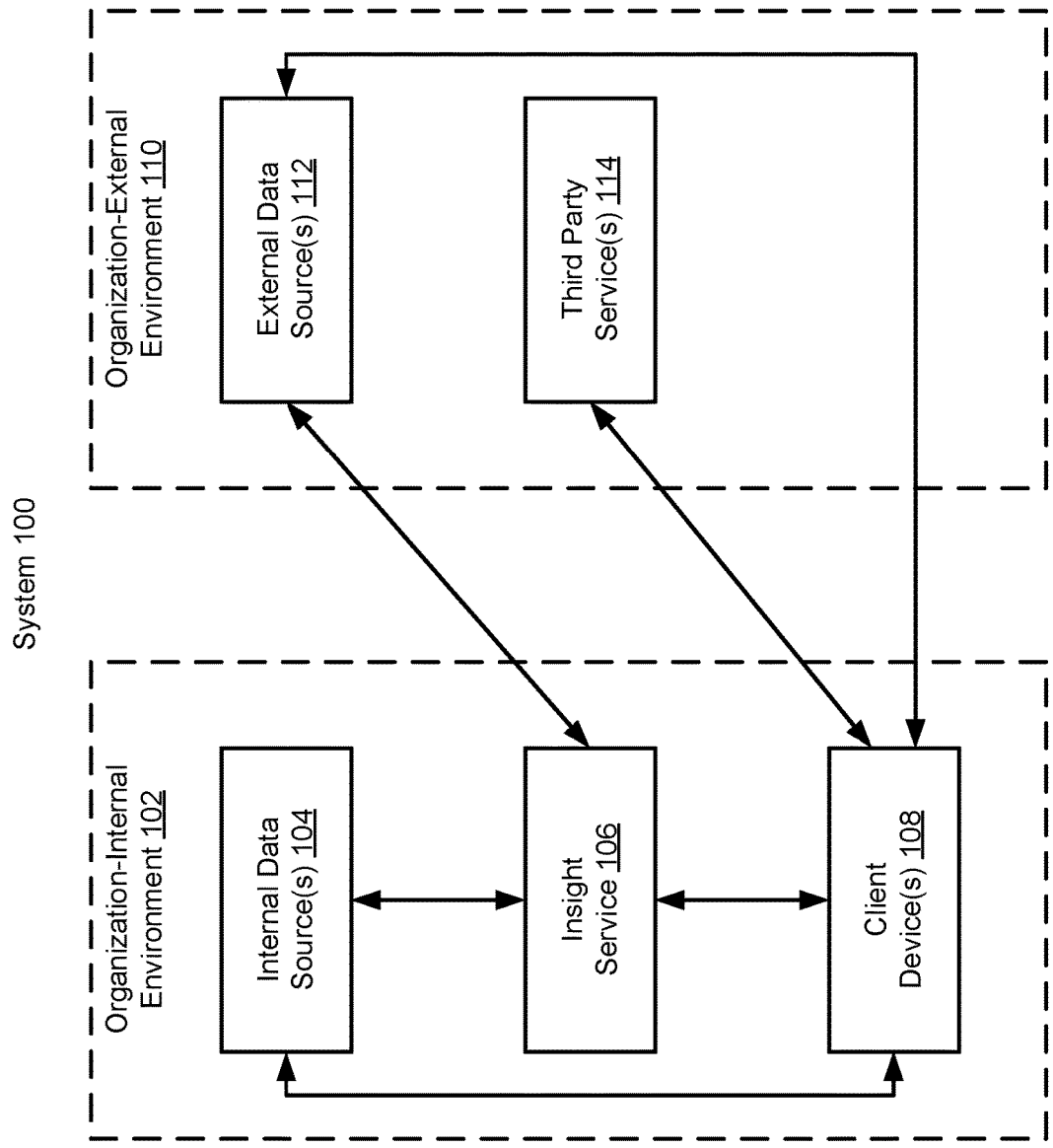
FIG. 1A shows a system in accordance with one or more embodiments disclosed herein.

FIG. 1A shows a system in accordance with one or more embodiments disclosed herein. The system (100) may include an organization-internal environment (102) and an organization-external environment (110). Each of these system (100) components is described below.

In one or many embodiment(s) disclosed herein, the organization-internal environment (102) may represent any digital (e.g., information technology (IT)) ecosystem belonging to, and thus managed by, an organization. Examples of said organization may include, but are not limited to, a business/commercial entity, a higher education school, a government agency, and a research institute. The organization-internal environment (102), accordingly, may at least reference one or more data centers of which the organization is the proprietor. Further, the organization-internal environment (102) may include one or more internal data sources (104), an insight service (106), and one or more client devices (108). Each of these organization-internal environment (102) subcomponents may or may not be co-located, and thus reside and/or operate, in the same physical or geographical space. Moreover, each of these organization-internal environment (102) subcomponents is described below.

In one or many embodiment(s) disclosed herein, an internal data source (104) may represent any data source belonging to, and thus managed by, the above-mentioned organization. A data source, in turn, may generally refer to a location where data or information (also referred to herein as one or more assets) resides. An asset, accordingly, may be exemplified through structured data/information (e.g., tabular data/information or a dataset) or through unstructured data/information (e.g., text, an image, audio, a video, an animation, multimedia, etc.). Furthermore, any internal data source (104), more specially, may refer to a location that stores at least a portion of the asset(s) generated, modified, or otherwise interacted with, solely by entities (e.g., the insight service (106) and/or the client device(s) (108)) within the organization-internal environment (102). Entities outside the organization-internal environment may not be permitted to access any internal data source (104) and, therefore, may not be permitted to access any asset(s) maintained therein.

Moreover, in one or many embodiment(s) disclosed herein, any internal data source (104) may be implemented as physical storage (and/or as logical/virtual storage spanning at least a portion of the physical storage). The physical storage may, at least in part, include persistent storage, where examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one or many embodiment(s) disclosed herein, the insight service (106) may represent information technology infrastructure configured for digitally-assisted organization strategy. In brief, organization strategy may reference a plan (or a sum of actions), intended to be pursued by an organization, directed to leveraging organization resources towards achieving one or more long-term goals. Said long-term goal(s) may, for example, relate to identifying or predicting future or emergent trends across one or more industries. Digitally-assisted organization strategy, meanwhile, references the scheming and/or implementation of organization strategy, at least in part, through insights distilled by artificial intelligence. An insight, in turn, may be defined as a finding (or more broadly, as useful knowledge) gained through data analytics or, more precisely, through the discovery of patterns and/or relationships amongst an assortment of data/information (e.g., assets). The insight service (106), accordingly, may employ artificial intelligence to ingest assets maintained across various data sources (e.g., one or more internal data sources (104) and/or one or more external data sources (112)) and, subsequently, derive or infer insights therefrom that are supportive of an organization strategy for an organization.

In one or many embodiment(s) disclosed herein, the insight service (106) may be configured with various capabilities or functionalities directed to digitally-assisted organization strategy. Said capabilities/functionalities may include: insight creation transparency, as described in FIGS. 3A and 3B as well as exemplified in FIG. 5, below. Further, the insight service (106) may perform other capabilities/functionalities without departing from the scope disclosed herein.

In one or many embodiment(s) disclosed herein, the insight service (106) may be implemented through on-premises infrastructure, cloud computing infrastructure, or any hybrid infrastructure thereof. The insight service (106), accordingly, may be implemented using one or more network servers (not shown), where each network server may represent a physical or a virtual network server. Additionally, or alternatively, the insight service (106) may be implemented using one or more computing systems each similar to the example computing system shown and described with respect to FIG. 4, below.

In one or many embodiment(s) disclosed herein, a client device (108) may represent any physical appliance or computing system operated by one or more organization users and configured to receive, generate, process, store, and/or transmit data/information (e.g., assets), as well as to provide an environment in which one or more computer programs (e.g., applications, insight agents, etc.) may execute thereon. An organization user, briefly, may refer to any individual whom is affiliated with, and fulfills one or more roles pertaining to, the organization that serves as the proprietor of the organization-internal environment (102). Further, in providing an execution environment for any computer programs, a client device (108) may include and allocate various resources (e.g., computer processors, memory, storage, virtualization, network bandwidth, etc.), as needed, to the computer programs and the tasks (or processes) instantiated thereby. Examples of a client device (108) may include, but are not limited to, a desktop computer, a laptop computer, a tablet computer, a smartphone, or any other computing system similar to the example computing system shown and described with respect to FIG. 4, below. Moreover, any client device (108) is described in further detail through FIG. 1B, below.

In one or many embodiment(s) disclosed herein, the organization-external environment (110) may represent any number of digital (e.g., IT) ecosystems not belonging to, and thus not managed by, an/the organization serving as the proprietor of the organization-internal environment (102). The organization-external environment (110), accordingly, may at least reference any public networks including any respective service(s) and data/information (e.g., assets). Further, the organization-external environment (110) may include one or more external data sources (112) and one or more third-party services (114). Each of these organization-external environment (110) subcomponents may or may not be co-located, and thus reside and/or operate, in the same physical or geographical space. Moreover, each of these organization-external environment (110) subcomponents is described below.

In one or many embodiment(s) disclosed herein, an external data source (112) may represent any data source (described above) not belonging to, and thus not managed by, an/the organization serving as the proprietor of the organization-internal environment (102). Any external data source (112), more specially, may refer to a location that stores at least a portion of the asset(s) found across any public networks. Further, depending on their respective access permissions, entities within the organization-internal environment (102), as well as those throughout the organization-external environment (110), may or may not be permitted to access any external data source (104) and, therefore, may or may not be permitted to access any asset(s) maintained therein.

Moreover, in one or many embodiment(s) disclosed herein, any external data source (112) may be implemented as physical storage (and/or as logical/virtual storage spanning at least a portion of the physical storage). The physical storage may, at least in part, include persistent storage, where examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one or many embodiment(s) disclosed herein, a third party service (114) may represent information technology infrastructure configured for any number of purposes and/or applications. A third party, whom may implement and manage one or more third party services (114), may refer to an individual, a group of individuals, or another organization (i.e., not the organization serving as the proprietor of the organization-internal environment (102)) that serves as the proprietor of said third party service(s) (114). By way of an example, one such third party service (114), as disclosed herein may be exemplified by an automated machine learning (ML) service. A purpose of the automated ML service may be directed to automating the selection, composition, and parameterization of ML models. That is, more simply, the automated ML service may be configured to automatically identify one or more optimal ML algorithms from which one or more ML models may be constructed and fit to a submitted dataset in order to best achieve any given set of tasks. Further, any third party service (114) is not limited to the aforementioned specific example.

In one or many embodiment(s) disclosed herein, any third party service (114) may be implemented through on-premises infrastructure, cloud computing infrastructure, or any hybrid infrastructure thereof. Any third party service (114), accordingly, may be implemented using one or more network servers (not shown), where each network server may represent a physical or a virtual network server. Additionally, or alternatively, any third party service (114) may be implemented using one or more computing systems each similar to the example computing system shown and described with respect to FIG. 4, below.

In one or many embodiment(s) disclosed herein, the above-mentioned system (100) components, and their respective subcomponents, may communicate with one another through a network (not shown) (e.g., a local area network (LAN), a wide area network (WAN) such as the Internet, a mobile network, any other communication network type, or a combination thereof). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components and their respective subcomponents. Moreover, in communicating with one another, the above-mentioned system (100) components, and their respective subcomponents, may employ any combination of existing wired and/or wireless communication protocols.

While FIG. 1A shows a configuration of components and/or subcomponents, other system (100) configurations may be used without departing from the scope disclosed herein.

Figure 1B:
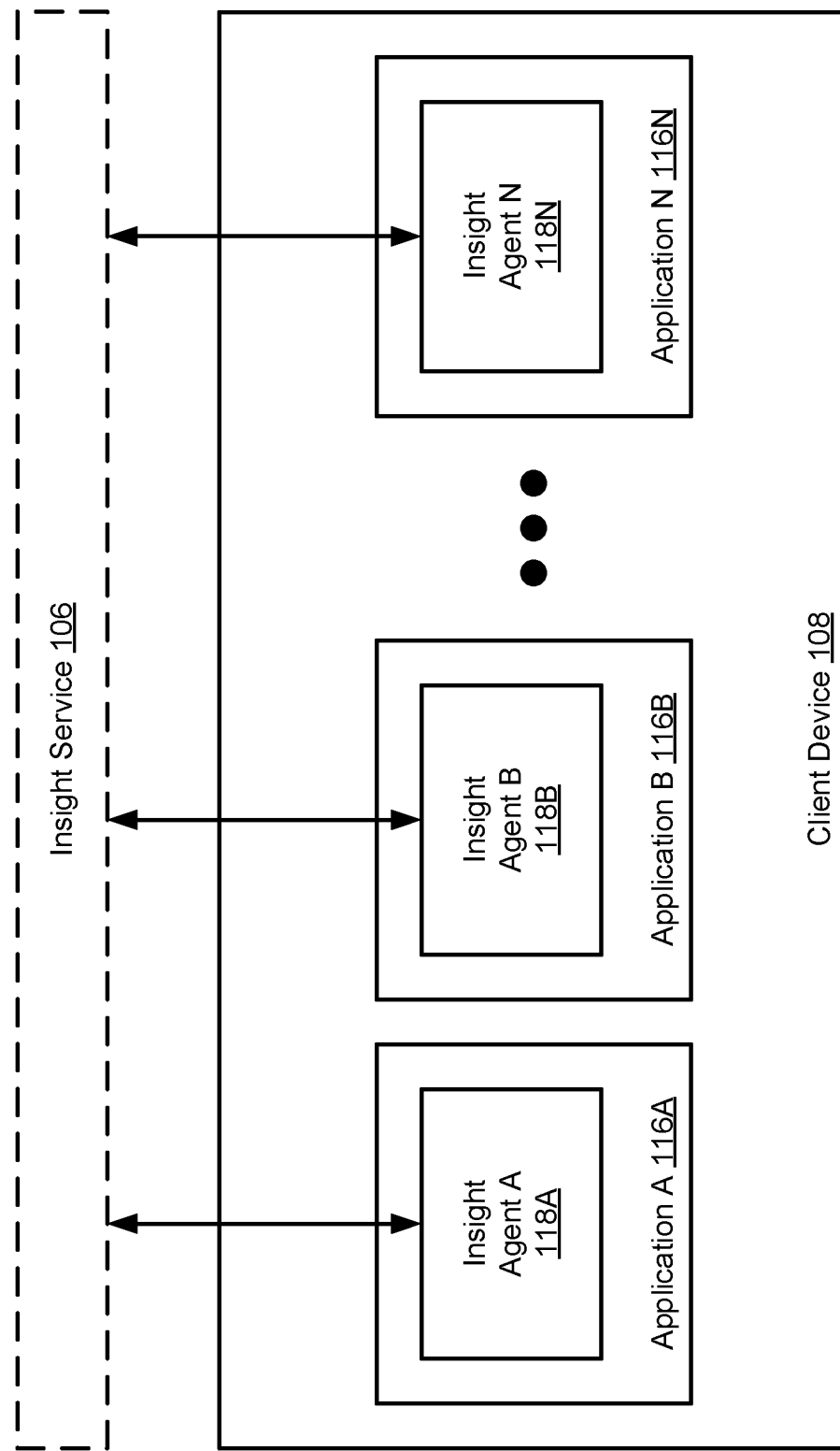
FIG. 1B shows a client device in accordance with one or more embodiments disclosed herein.

FIG. 1B shows a client device in accordance with one or more embodiments disclosed herein. The client device (108) (described above as well) (see e.g., FIG. 1A) may host or include one or more applications (116A-116N). Each application (116A-116N), in turn, may host or include an insight agent (118A-118N). Each of these client device (108) subcomponents is described below.

In one or many embodiment(s) disclosed herein, an application (116A-116N) (also referred to herein as a software application or program) may represent a computer program, or a collection of computer instructions, configured to perform one or more specific functions. Broadly, examples of said specific function(s) may include, but are not limited to, receiving, generating and/or modifying, processing and/or analyzing, storing or deleting, and transmitting data/information (e.g., assets) (or at least portions thereof). That is, said specific function(s) may generally entail one or more interactions with data/information either maintained locally on the client device (108) or remotely across one or more data sources. Examples of an application (116A-116N) may include a word processor, a spreadsheet editor, a presentation editor, a database manager, a graphics renderer, a video editor, an audio editor, a web browser, a collaboration tool or platform, and an electronic mail (or email) client. Any application (116A-116N), further, is not limited to the aforementioned specific examples.

In one or many embodiment(s) disclosed herein, any application (116A-116N) may be employed by one or more organization users, which may be operating the client device (108), to achieve one or more tasks, at least in part, contingent on the specific function(s) that the application (116A-116N) may be configured to perform. Said task(s) may or may not be directed to supporting and/or achieving any short-term and/or long-term goal(s) outlined by an/the organization with which the organization user(s) may be affiliated.

In one or many embodiment(s) disclosed herein, an insight agent (118A-118N) may represent a computer program, or a collection of computer instructions, configured to perform any number of tasks in support, or as extensions, of the capabilities or functionalities of the insight service (106) (described above) (see e.g., FIG. 1A). With respect to their assigned application (116A-116N), examples of said tasks, which may be carried out by a given insight agent (118A-118N), may include: detecting an initiation of their assigned application (116A-116N) by the organization user(s) operating the client device (108); monitoring any engagement (or interaction), by the organization user(s), with their assigned application (116A-116N) following the detected initiation thereof; identifying certain engagement/interaction actions, performed by the organization user(s), based on said engagement/interaction monitoring; executing any number of procedures or algorithms, relevant to one or more insight service (106) capabilities/functionalities, in response to one or more of the identified certain engagement/interaction actions; providing periodic and/or on-demand telemetry to the insight service (106), where said telemetry may include, for example, data/information requiring processing or analysis to be performed on/by the insight service (106); and receive periodic and/or on-demand updates (and/or instructions) from the insight service (106). Further, the tasks carried out by any insight agent (118A-118N) are not limited to the aforementioned specific examples.

While FIG. 1B shows a configuration of components and/or subcomponents, other client device (108) configurations may be used without departing from the scope disclosed herein. For example, in one or many embodiment(s) disclosed herein, not all of the application(s) (116A-116N), executing on the client device (108), may host or include an insight agent (118A-118N). That is, in said embodiment(s), an insight agent (118A-118N) may not be assigned to or associated with any of at least a subset of the application(s) (116A-116N) installed on the client device (108).

Figure 2A:
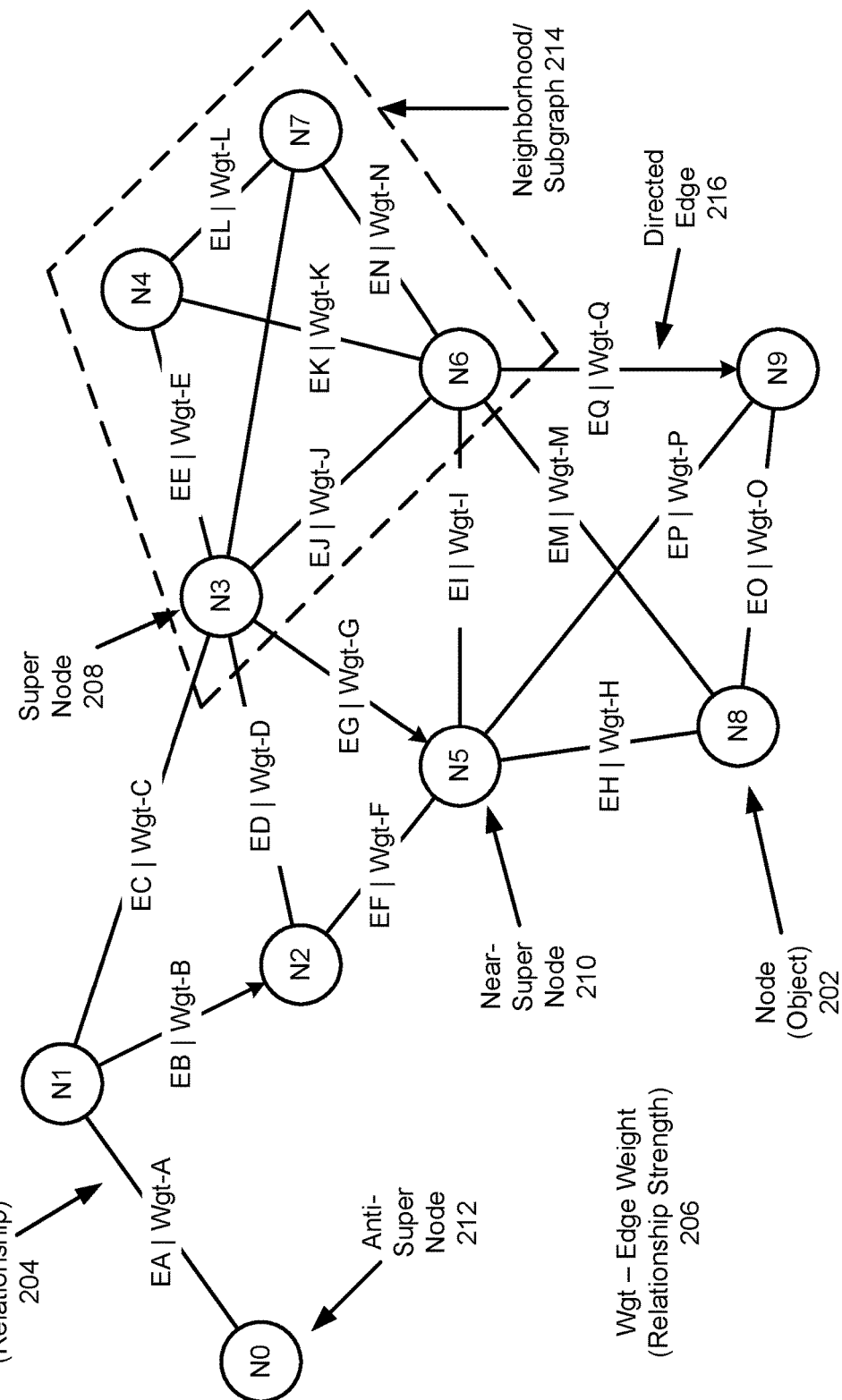
FIG. 2A shows an example connected graph in accordance with one or more embodiments disclosed herein.

FIG. 2A shows an example connected graph in accordance with one or more embodiments disclosed herein. A connected graph (200), as disclosed herein, may refer to a set of nodes (202) (denoted in the example by the circles labeled N0, N1, N2, . . . , N9) interconnected by a set of edges (204, 216) (denoted in the example by the lines labeled EA, EB, EC, . . . , EQ between pairs of nodes). Each node (202) may represent or correspond to an object (e.g., a catalog entry, a record, specific data/information, a person, etc.) whereas each edge (204, 216), between or connecting any pair of nodes, may represent or correspond to a relationship, or relationships, associating the objects mapped to the pair of nodes. A connected graph (200), accordingly, may reference a data structure that reflects associations amongst any number, or a collection, of objects.

In one or many embodiment(s) disclosed herein, each node (202), in a connected graph (200), may also be referred to herein, and thus may serve, as an endpoint (of a pair of endpoints) of/to at least one edge (204). Further, based on a number of edges connected thereto, any node (202), in a connected graph (200), may be designated or identified as a super node (208), a near-super node (210), or an anti-super node (212). A super node (208) may reference any node where the number of edges, connected thereto, meets or exceeds a (high) threshold number of edges (e.g., six (6) edges). A near-super node (210), meanwhile, may reference any node where the number of edges, connected thereto, meets or exceeds a first (high) threshold number of edges (e.g., five (5) edges) yet lies below a second (higher) threshold number of edges (e.g., six (6) edges), where said second threshold number of edges defines the criterion for designating/identifying a super node (208). Lastly, an anti-super node (212) may reference any node where the number of edges, connected thereto, lies below a (low) threshold number of edges (e.g., two (2) edges).

In one or many embodiment(s) disclosed herein, each edge (204, 216), in a connected graph (200), may either be designated or identified as an undirected edge (204) or, conversely, as a directed edge (216). An undirected edge (204) may reference any edge specifying a bidirectional relationship between objects mapped to the pair of endpoints (i.e., pair of nodes (202)) connected by the edge. A directed edge (216), on the other hand, may reference any edge specifying a unidirectional relationship between objects mapped to the pair of endpoints connected by the edge.

In one or many embodiment(s) disclosed herein, each edge (204, 216), in a connected graph (200), may be associated with or assigned an edge weight (206) (denoted in the example by the labels Wgt-A, Wgt-B, Wgt-C, . . . , Wgt-Q). An edge weight (206), of a given edge (204, 216), may reflect a strength of the relationship(s) represented by the given edge (204, 216). Further, any edge weight (206) may be expressed as or through a positive numerical value within a predefined spectrum or range of positive numerical values (e.g., 0.1 to 1.0, 1 to 100, etc.). Moreover, across the said predefined spectrum/range of positive numerical values, higher positive numerical values may reflect stronger relationships, while lower positive numerical values may alternatively reflect weaker relationships.

In one or many embodiment(s) disclosed herein, based on an edge weight (206) associated with or assigned to an edge (204, 216) connected thereto, any node (202), in a connected graph (200), may be designated or identified as a strong adjacent node (not shown) or a weak adjacent node (not shown) with respect to the other endpoint of (i.e., the other node connected to the node (202) through) the edge (204, 216). That is, a strong adjacent node may reference any node of a pair of nodes connected by an edge, where an edge weight of the edge meets or exceeds a (high) edge weight threshold. Alternatively, a weak adjacent node may reference any node of a pair of nodes connected by an edge, where an edge weight of the edge lies below a (low) edge weight threshold.

In one or many embodiment(s) disclosed herein, a connected graph (200) may include one or more subgraphs (214) (also referred to as neighborhoods). A subgraph (214) may refer to a smaller connected graph found within a (larger) connected graph (200). A subgraph (214), accordingly, may include a node subset of the set of nodes (202), and an edge subset of the set of edges (204, 216), that form a connected graph (200), where the edge subset interconnects the node subset.

While FIG. 2A shows a configuration of components and/or subcomponents, other connected graph (200) configurations may be used without departing from the scope disclosed herein.

Figure 2B:
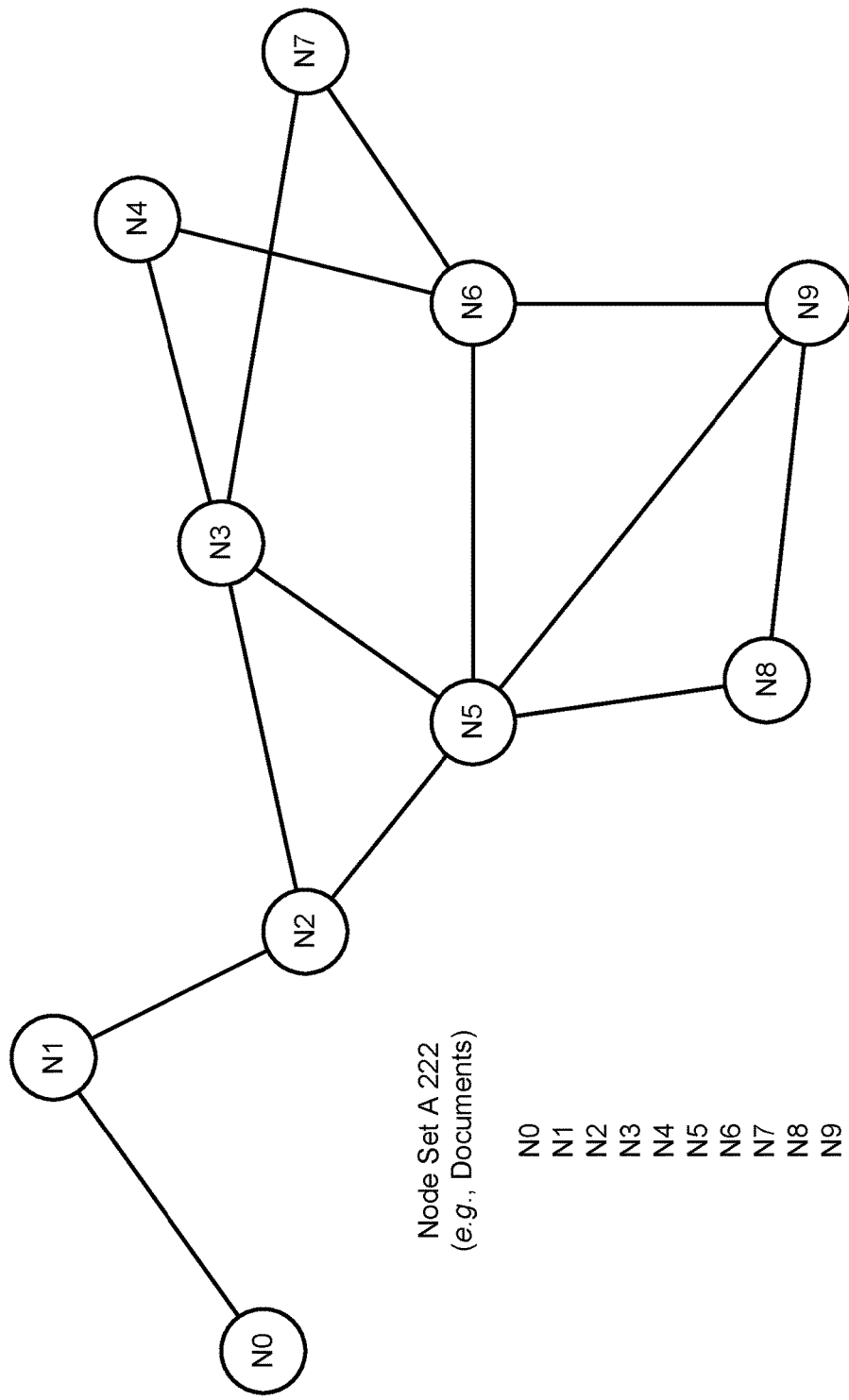
FIGS. 2B-2D show example k-partite connected graphs in accordance with one or more embodiments disclosed herein.
Figure 2C:
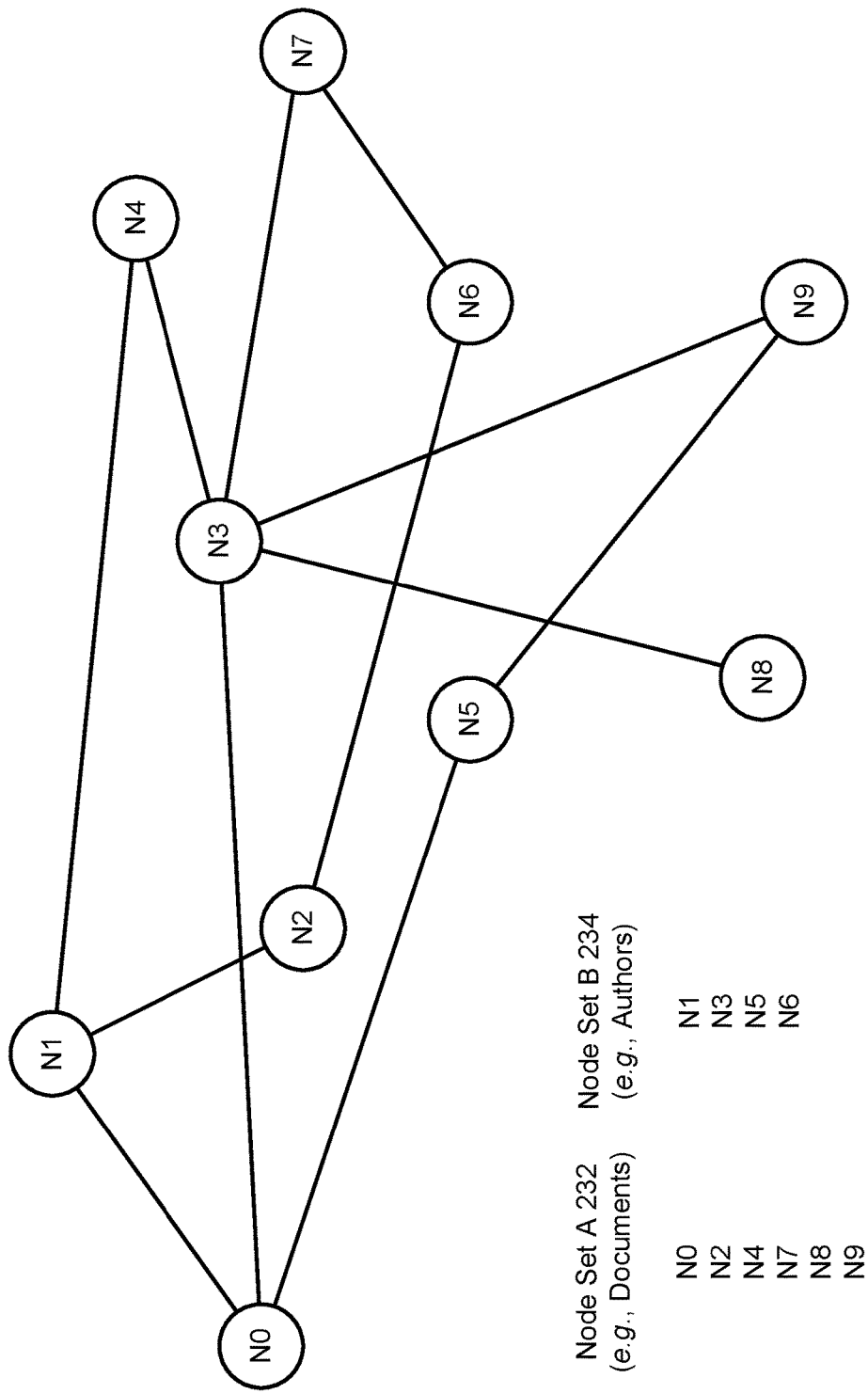
Figure 2D:
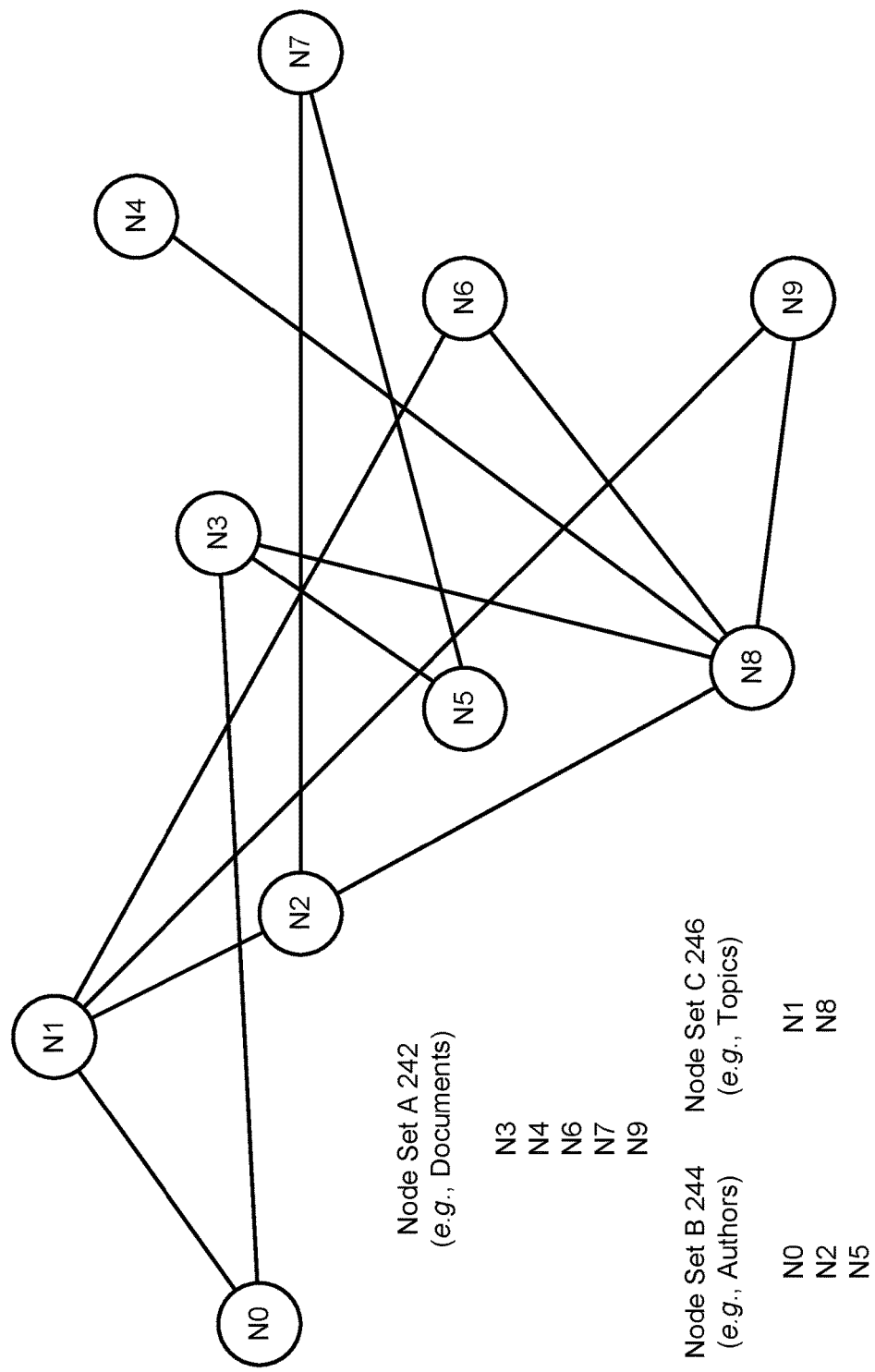

FIGS. 2B-2D show example k-partite connected graphs in accordance with one or more embodiments disclosed herein. Generally, any k-partite connected graph may represent a connected graph (described above) (see e.g., FIG. 2A) that encompasses k independent sets of nodes and a set of edges interconnecting (and thus defining relationships between) pairs of nodes: (a) both belonging to the same, single independent set of nodes in any (k=1)-partite connected graph; or (b) each belonging to a different independent set of nodes in any (k>1)-partite connected graph. Further, any k-partite connected graph, as disclosed herein, may fall into one of three possible classifications: (a) a uni-partite connected graph, where k=1; (b) a bi-partite connected graph, where k=2; or (c) a multi-partite connected graph, where k≥3.

Turning to FIG. 2B, an example uni-partite connected graph (220) is depicted. The uni-partite connected graph (220) includes one (k=1) independent set of nodes—i.e., a node set (222), which collectively maps or belongs to a single object class (e.g., documents).

Further, in the example, the node set is denoted by the circles labeled N0, N1, N2, . . . , N9. Each said circle, in the node set (222), subsequently denotes a node that represents or corresponds to a given object (e.g., a document) in a collection of objects (e.g., a group of documents) of the same object class (e.g., documents).

Moreover, the uni-partite connected graph (220) additionally includes a set of edges (denoted in the example by the lines interconnecting pairs of nodes, where the first and second nodes in a given node pair belongs to the node set (222)). Each edge, in the example, thus reflects a relationship, or relationships, between any two nodes of the node set (222) (and, by association, any two objects of the same object class) directly connected via the edge.

Turning to FIG. 2C, an example bi-partite connected graph (230) is depicted. The bi-partite connected graph (230) includes two (k=2) independent sets of nodes—i.e., a first node set (232) and a second node set (234), where the former collectively maps or belongs to a first object class (e.g., documents) whereas the latter collectively maps or belongs to a second object class (e.g., authors).

Further, in the example, the first node set (232) is denoted by the circles labeled N0, N2, N4, N7, N8, and N9, while the second node set (234) is denoted by the circles labeled N1, N3, N5, and N6. Each circle, in the first node set (232), subsequently denotes a node that represents or corresponds to a given first object (e.g., a document) in a collection of first objects (e.g., a group of documents) of the first object class (e.g., documents). Meanwhile, each circle, in the second node set (234), subsequently denotes a node that represents or corresponds to a given second object (e.g., an author) in a collection of second objects (e.g., a group of authors) of the second object class (e.g., authors).

Moreover, the bi-partite connected graph (230) additionally includes a set of edges (denoted in the example by the lines interconnecting pairs of nodes, where a first node in a given node pair belongs to the first node set (232) and a second node in the given node pair belongs to the second node set (234)). Each edge, in the example, thus reflects a relationship, or relationships, between any one node of the first node set (232) and any one node of the second node set (234) (and, by association, any one object of the first object class and any one object of the second object class) directly connected via the edge.

Turning to FIG. 2D, an example multi-partite connected graph (240) is depicted. The multi-partite connected graph (240) includes three (k=3) independent sets of nodes—i.e., a first node set (242), a second node set (244), and a third node set (246). The first node set (242) collectively maps or belongs to a first object class (e.g., documents); the second node set (244) collectively maps or belongs to a second object class (e.g., authors); and the third node set (246) collectively maps or belongs to a third object class (e.g., topics).

Further, in the example, the first node set (242) is denoted by the circles labeled N3, N4, N6, N7, and N9; the second node set (244) is denoted by the circles labeled N0, N2, and N5; and the third node set (246) is denoted by the circles labeled N1 and N8. Each circle, in the first node set (242), subsequently denotes a node that represents or corresponds to a given first object (e.g., a document) in a collection of first objects (e.g., a group of documents) of the first object class (e.g., documents). Meanwhile, each circle, in the second node set (244), subsequently denotes a node that represents or corresponds to a given second object (e.g., an author) in a collection of second objects (e.g., a group of authors) of the second object class (e.g., authors). Lastly, each circle, in the third node set (246), subsequently denotes a node that represents or corresponds to a given third object (e.g., a topic) in a collection of third objects (e.g., a group of topics) of the third object class (e.g., topics).

Moreover, the multi-partite connected graph (240) additionally includes a set of edges (denoted in the example by the lines interconnecting pairs of nodes, where a first node in a given node pair belongs to one object class from the three available object classes, and a second node in the given node pair belongs to another object class from the two remaining object classes (that excludes the one object class to which the first node in the given node pair belongs)). Each edge, in the example, thus reflects a relationship, or relationships, between any one node of one object class (from the three available object classes) and any one node of another object class (from the two remaining object class excluding the one object class) directly connected via the edge.

Figure 3A:
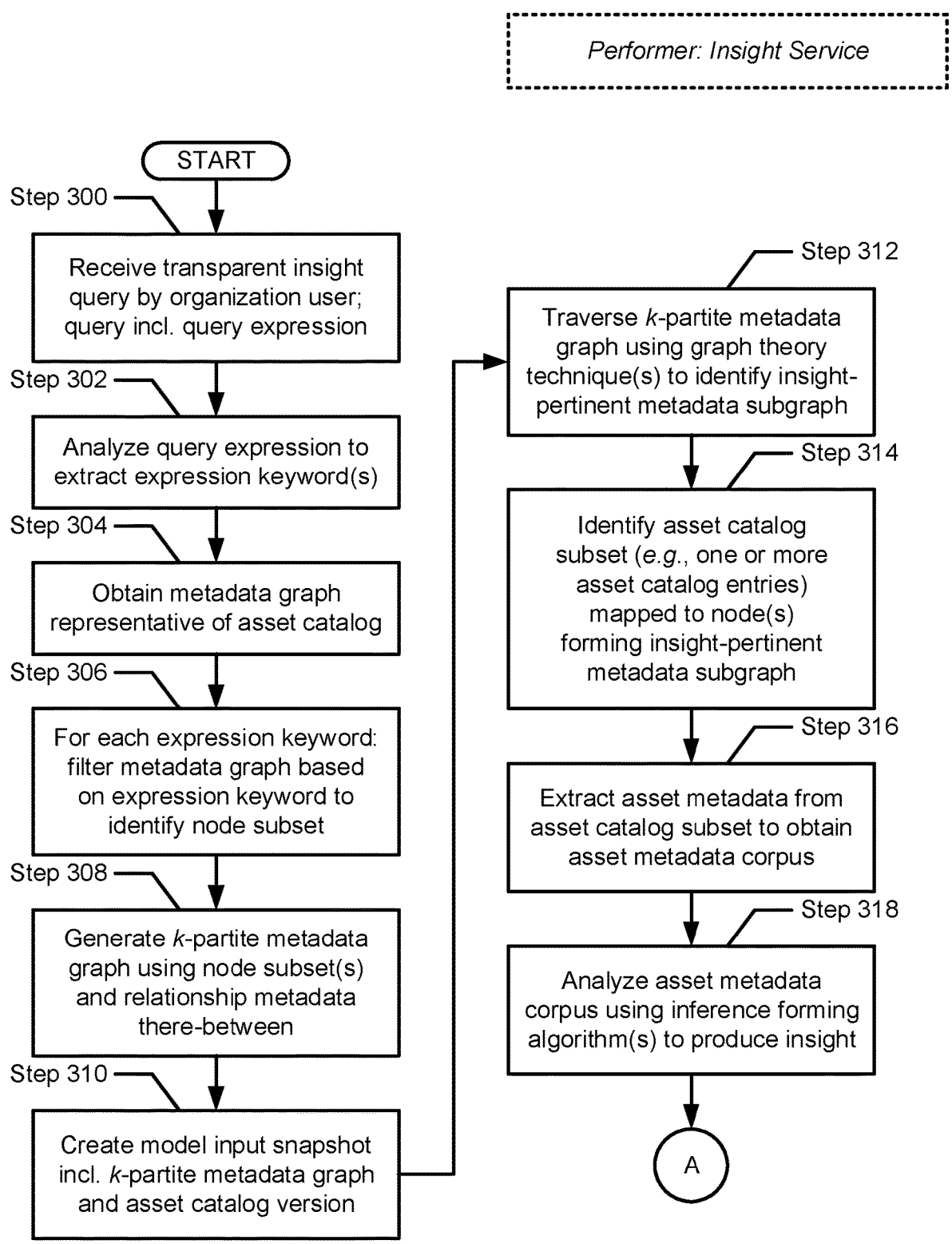
FIGS. 3A and 3B show flowcharts describing a method for insight creation transparency in accordance with one or more embodiments disclosed herein.
Figure 3B:
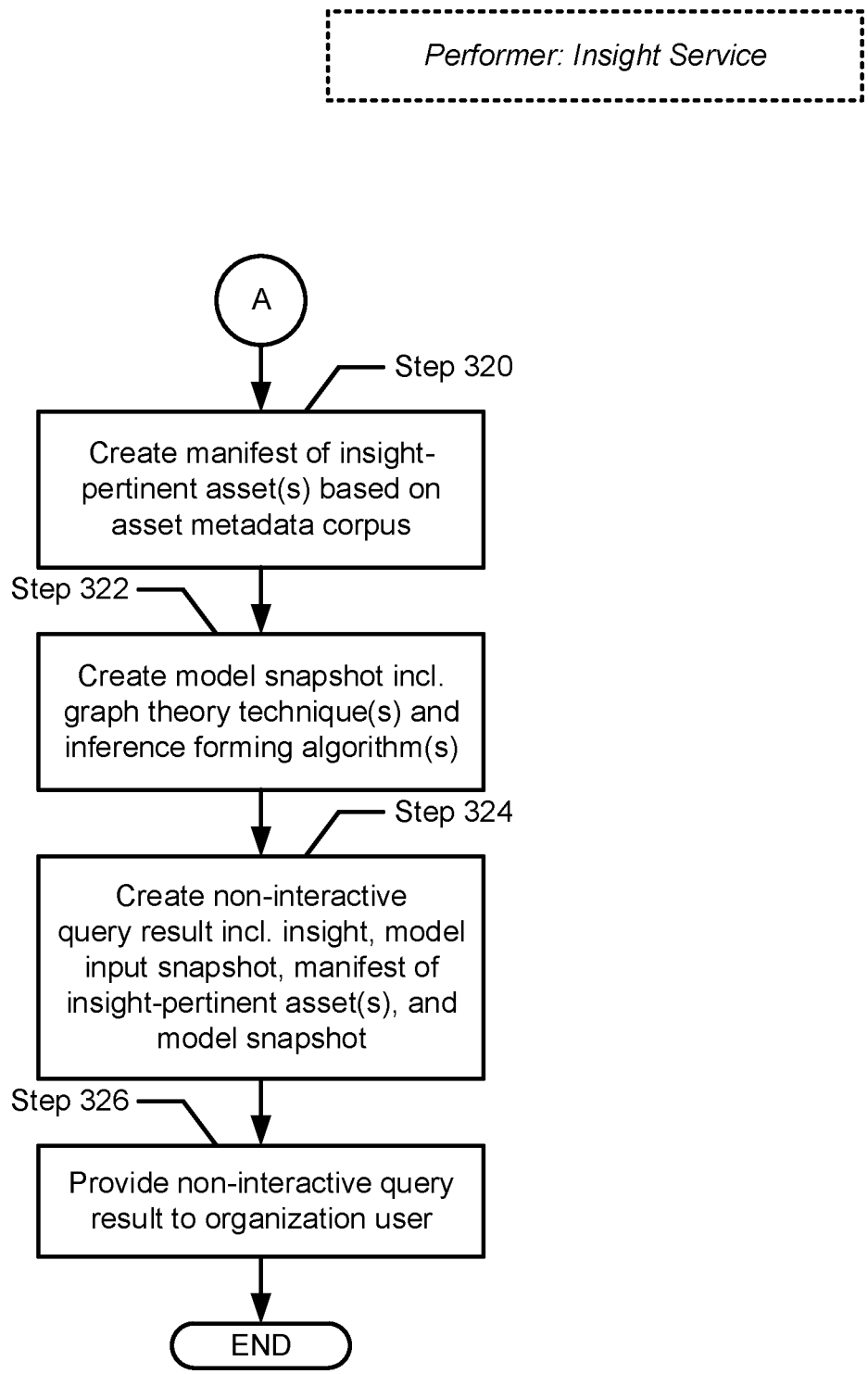

FIGS. 3A and 3B show flowcharts describing a method for insight creation transparency in accordance with one or more embodiments disclosed herein. The various steps outlined below may be performed by an insight service (see e.g., FIG. 1A). Further, while the various steps in the flowchart are presented and described sequentially, one of ordinary skill will appreciate that some or all steps may be executed in different orders, may be combined or omitted, and some or all steps may be executed in parallel.

Turning to FIG. 3A, in Step 300, a transparent insight query is received. In one or many embodiment(s) disclosed herein, the transparent insight query may include or specify a query expression. The query expression, in turn, may refer to a series of terms (e.g., a sentence), either expressed through text or vocal input, which represents a given query being posed. Further, the transparent insight query may have been submitted by an organization user seeking one or more insights addressing the query expression, as well as other information providing transparency as to how the sought insight(s) may have been derived or inferred. Any insight, meanwhile, may be defined as a finding (or more broadly, as useful knowledge) gained through data analytics or, more precisely, through the discovery of patterns and/or relationships amongst any given assortment of data/information.

In Step 302, the query expression (received via the transparent insight query in Step 300) is analyzed. In one or many embodiment(s) disclosed herein, analysis of the query expression may, for example, employ or apply any existing keyword extraction algorithm(s). The analysis of the query expression, accordingly, may result in the extraction of one or more expression keywords, where the extracted expression keyword(s) may best describe, or otherwise represent, the query expression.

In Step 304, a metadata graph is obtained. In one or many embodiment(s) disclosed herein, the metadata graph may refer to a connected graph (see e.g., FIG. 2A) representative of an asset catalog. The asset catalog may refer to a data structure configured to maintain asset metadata (examples of which are disclosed below) describing a collection of assets known to the insight service, where any asset, in said collection of assets, may refer to either a structured item of information (e.g., tabular data or a dataset) or an unstructured item of information (e.g., text, an image, a video, audio, multimedia, etc.). Further, the asset metadata, maintained in the asset catalog, may be organized across a set of asset catalog entries, where each asset catalog entry may map/correspond to a given asset in the collection of assets and, therefore, may store asset metadata particular to the given asset. The metadata graph, meanwhile, may include or be composed from a set of nodes interconnected by a set of edges, where the set of nodes are representative of the set of asset catalog entries, respectively, whereas the set of edges are representative of connections or relationships therebetween.

Examples of said asset metadata, describing any given asset, may include: an asset title or name associated with the given asset; a brief description of the asset; stewardship (or ownership, or authorship) information (e.g., individual or group name(s), contact information, etc.) pertaining to the steward(s)/owner(s)/author(s) of the given asset; a version character string reflective of a version or state of the given asset at/for a given point-in-time; one or more categories, topics, and/or aspects associated with the given asset; an asset identifier uniquely identifying the given asset; one or more tags, keywords, or terms further describing the given asset; a source identifier and/or location associated with an internal or external data source (see e.g., FIG. 1A) where the given asset resides or is maintained; and compliance information specifying laws, regulations, and standards surrounding the given asset, as well as policies directed to data governance (e.g., availability, usability, integrity, and security) pertinent to the given asset. Further, the asset metadata, for any given asset, is not limited to the aforementioned specific examples.

In Step 306, for each expression keyword, of the expression keyword(s) (extracted in Step 302), the metadata graph (obtained in Step 304) is filtered based on the expression keyword. In one or many embodiment(s) disclosed herein, each filtering of the metadata graph may, for example, entail topic or keyword matching (e.g., case-insensitive word or phrase matching) and/or semantic similarity calculation between a given expression keyword and the asset metadata, for the collection of assets, maintained in the set of asset catalog entries, of the asset catalog, to which the set of nodes of the metadata graph map/correspond. Further, each filtering of the metadata graph, based on a given expression keyword, may result in the identification of a node subset of the set of nodes forming the metadata graph. The identified node subset, subsequently, may include one or more nodes mapping/corresponding to one or more assets, respectively, that may be associated, at least in part, with the given expression keyword.

In Step 308, a k-partite metadata graph is generated using the node subset(s) (identified in Step 306). In one or many embodiment(s) disclosed herein, the k-partite metadata graph (see e.g., FIGS. 2B-2D) may reflect a new representation of, which may be based on one or more particular perspectives on, the metadata graph (obtained in Step 304). The k-partite metadata graph, further, may reflect a connected graph that encompasses k independent sets of nodes (i.e., the node subset(s), where k equals the number or cardinality of node subset(s)) and a set of edges interconnecting (and thus defining relationships between) pairs of nodes each belonging to a different independent set of nodes (or node subset)—with the exception of uni-(k=1) partite metadata graphs (see e.g., FIG. 2B) where the set of edges interconnect nodes of the single independent set of nodes (or single node subset) forming the uni-partite metadata graphs.

In Step 310, a model input snapshot is created. In one or many embodiment(s) disclosed herein, the model input snapshot may represent an item of information (e.g., a data file) that captures the state of a model input at a given point-in-time. The model input, in turn, may refer to one or more items of information that serve(s) as input to an insight inferring model (e.g., a machine learning or artificial intelligence driven model), which may be employed by the insight service, to render one or more insights. Any insight, as disclosed herein, may be defined as a finding (or more broadly, as useful knowledge) gained through data analytics or, more precisely, through the discovery of patterns and/or relationships amongst an assortment of data/information (e.g., the model input). Further, the created model input snapshot may include the following model input state: the k-partite metadata graph (generated in Step 308); and an asset catalog version/version number associated with the asset catalog represented by the metadata graph (obtained in Step 304).

In Step 312, the k-partite metadata graph (generated in Step 308) is traversed. In one or many embodiment(s) disclosed herein, traversal of the k-partite metadata graph may, for example, employ one or more graph theory techniques directed to identifying a subset of nodes from the set of nodes forming the k-partite metadata graph, where each node in the subset of nodes may be deemed most impactful to the derivation, or inference, of any insight(s) addressing the transparent insight query (or the query expression thereof) (received in Step 300).

In one or many embodiment(s) disclosed herein, identification of the subset of nodes, or any node(s) deemed most impactful to the derivation or inference of any insight(s), may alternatively entail: (a) examining asset metadata pertaining to assets mapped to the nodes in/of the k-partite metadata graph (generated in Step 308); (b) assigning weights to the nodes, respectively, based on the examined asset metadata; (c) applying a ranking algorithm to the mapped assets based on the assigned weights in order to obtain ranked assets; (d) identifying, or selecting, a subset of the ranked assets, where each ranked asset in the subset of ranked assets holds a rank meeting and/or exceeding a predefined rank threshold; and (e) mapping the subset of ranked assets, respectively, to the subset of nodes.

Further, in one or many embodiment(s) disclosed herein, traversal of the k-partite metadata graph may result in the identification of an insight-pertinent metadata subgraph. A metadata subgraph may generally refer to a connected graph that may be found within, and therefore may include at least a portion of the elements (e.g., a set of nodes interconnected by a set of edges) forming, a larger connected graph (e.g., the k-partite metadata graph). The insight-pertinent metadata subgraph, accordingly, may reference a metadata subgraph, of the k-partite metadata graph, that has been deemed most impactful to the derivation, or inference, of any insight(s) addressing the transparent insight query (or the query expression thereof) (received in Step 300). The insight-pertinent metadata subgraph, moreover, may include the above-mentioned subset of nodes (also referred to herein as a/the set of subgraph nodes), as well as any subset or all edges (also referred to herein as a/the set of subgraph edges) interconnecting said set of subgraph nodes, from the set of nodes and the set of edges forming the k-partite metadata graph, which may also (by association) be deemed the most impactful to the derivation, or inference, of the any said insight(s).

In Step 314, an asset catalog subset is identified. In one or many embodiment(s) disclosed herein, the asset catalog subset may include, and thus refer to, one or more asset catalog entries representing at least a subset of the set of asset catalog entries of the asset catalog (mentioned in Step 304). Further, each asset catalog entry, in the asset catalog subset, may map/correspond to a (different) node in the set of subgraph nodes, at least in part, forming the insight-pertinent metadata subgraph (identified in Step 312).

In Step 316, an asset metadata corpus is obtained from, or based on, the asset catalog subset (identified in Step 314). In one or many embodiment(s) disclosed herein, the asset metadata corpus may refer to a collection of (or aggregated) asset metadata, which may include (individual) asset metadata particular to, and therefore descriptive of, one or more assets (described above—see e.g., Step 304). Further, obtaining the asset metadata corpus may, for example, entail: extracting the (individual) asset metadata stored in each asset catalog entry in the asset catalog subset; and aggregating the extracted (individual) asset metadata to form the asset metadata corpus.

In Step 318, the asset metadata corpus (obtained in Step 316) is subsequently analyzed. In one or many embodiment(s) disclosed herein, analysis of the asset metadata corpus may, for example, employ one or more inference forming algorithms (examples of which are disclosed below) directed to deriving, or inferring, one or more findings (or useful knowledge). Said analysis of the asset metadata corpus, accordingly, may result in the production of one or more insights that may address the transparent insight query (or the query expression thereof) (received in Step 300).

Examples of the inference forming algorithm(s), which may be employed in the analysis of the asset metadata corpus, may include any existing rule-based, machine learning, and/or deep learning classification algorithms. Further, the inference forming algorithm(s) is/are not limited to the aforementioned specific examples.

Turning to FIG. 3B, in Step 320, a manifest of (or listing) one or more insight-pertinent assets is created based on the asset metadata corpus (obtained in Step 316). In one or many embodiment(s) disclosed herein, any insight-pertinent asset may refer to an asset that has been deemed most impactful to the derivation, or inference, of the insight(s) (produced in Step 318) that address the transparent insight query (or the query expression thereof) (received in Step 300). Further, identification of each insight-pertinent asset, of the insight-pertinent asset(s) listed in the manifest, may, for example, entail: obtaining an (individual) asset metadata from the (aggregated) asset metadata forming the asset metadata corpus; and examining at least a portion (e.g., an asset identifier) of the (individual) asset metadata to identify the insight-pertinent asset being described by the (individual) asset metadata. Further, for any insight-pertinent asset listed therein, the manifest may specify or include one or more other items of information (e.g., an asset title/name, an asset version, any asset stewardship/ownership/authorship information, any associated topic(s), aspect(s), tag(s), and/or keyword(s), etc.) that may be extracted from the (individual) asset metadata respective to the insight-pertinent asset.

In Step 322, a model snapshot is created. In one or many embodiment(s) disclosed herein, the model snapshot may represent an item of information (e.g., a data file) that captures the state of an insight inferring model (e.g., a machine learning or artificial intelligence driven model), which may be employed by the insight service, to render one or more insights. Further, the created model snapshot may include the following insight inferring model state: the graph theory technique(s) (employed in the traversal of the k-partite metadata graph in Step 312); and the inference forming algorithm(s) (employed in the analysis of the asset metadata corpus in Step 318).

In Step 324, a non-interactive query result is created. In one or many embodiment(s) disclosed herein, the non-interactive query result may refer to an electronic document (e.g., a query result page) displaying static content that cannot be adjusted through user engagement or interaction. Further, said content may include, but is not limited to: the insight(s) (produced in Step 318), the model input snapshot (created in Step 310), the manifest of (or listing) the insight-pertinent asset(s) (created in Step 320), and the model snapshot (created in Step 322).

In one or many embodiment(s) disclosed herein, and as recalled from above, the transparent insight query (received in Step 300) may have been submitted by the organization user whom seeks the insight(s) (produced in Step 318) that address the query expression received via the transparent insight query, but also seeks information that provides transparency as to how the insight(s) may have been derived or inferred. From the non-interactive query result (created in Step 324), said sought information may include the model input snapshot (created in Step 310), the manifest of (or listing) the insight-pertinent asset(s) (created in Step 320), and the model snapshot (created in Step 322). That is, the model input snapshot may reveal the input(s) used in deriving/inferring the insight(s); the manifest of (or listing) the insight-pertinent asset(s) may reveal the asset(s) (or, more specifically, the asset metadata thereof) deemed most impactful in deriving/inferring the insight(s); and the model snapshot may reveal the technique(s)/algorithm(s), applied to the input(s) and the asset metadata, and thus used in deriving/inferring the insight(s).

In Step 326, the non-interactive query result (created in Step 324) is provided in response to the transparent insight query (received in Step 300). Particularly, in one or many embodiment(s) disclosed herein, the non-interactive query result may be provided to the organization user who had submitted the transparent insight query.

Figure 4:
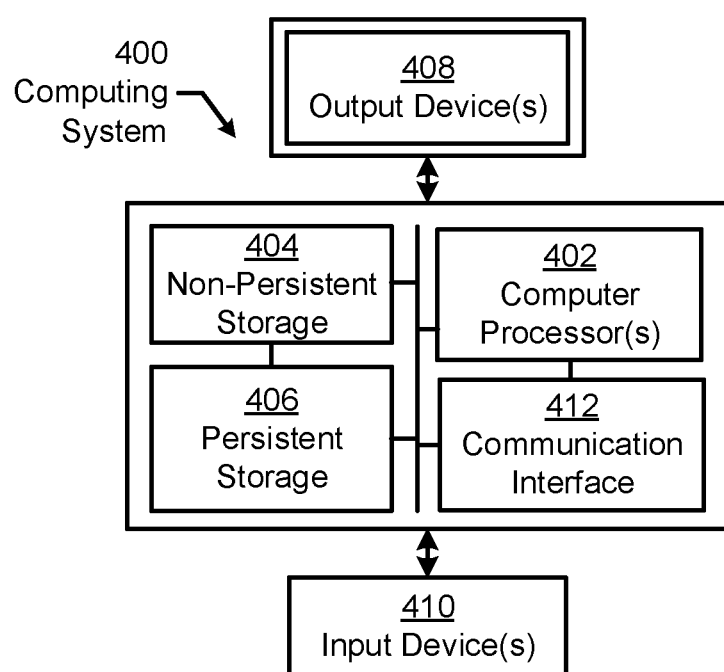
FIG. 4 shows an example computing system in accordance with one or more embodiments disclosed herein.

FIG. 4 shows an example computing system in accordance with one or more embodiments disclosed herein. The computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment disclosed herein, the computer processor(s) (402) may be an integrated circuit for processing instructions. For example, the computer processor(s) may be one or more cores or micro-cores of a central processing unit (CPU) and/or a graphics processing unit (GPU). The computing system (400) may also include one or more input devices (410), such as a touchscreen, keyboard, mouse, microphone, touchpad, electronic pen, or any other type of input device. Further, the communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

In one embodiment disclosed herein, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5:
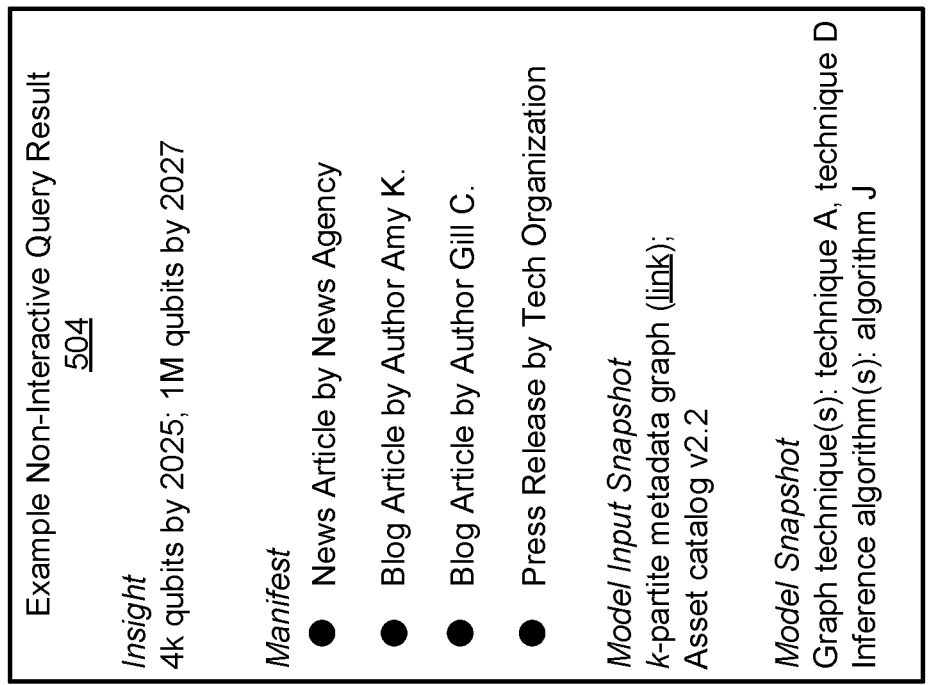
FIG. 5 shows an example scenario in accordance with one or more embodiments disclosed herein.
Figure 5:
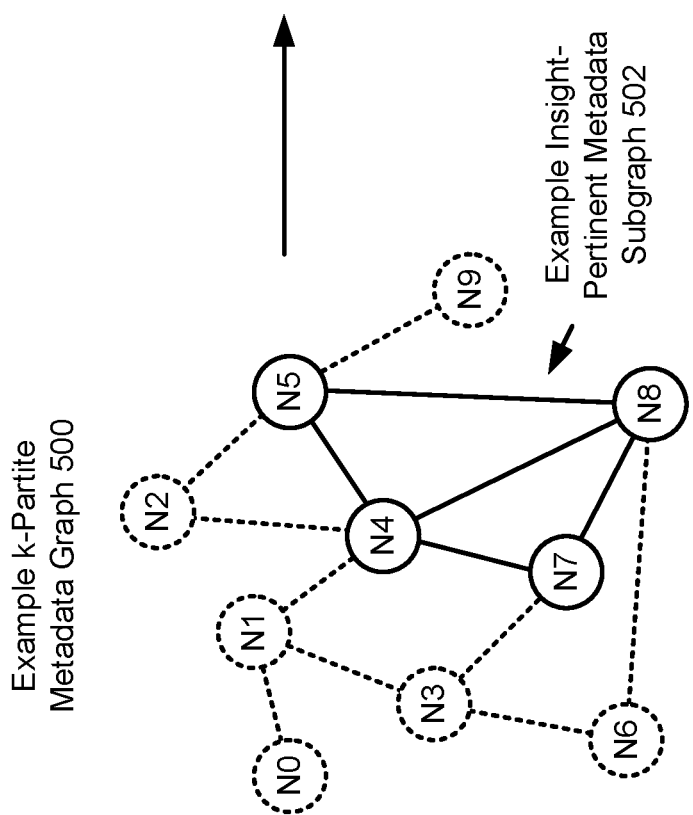

FIG. 5 shows an example scenario in accordance with one or more embodiments disclosed herein. The example scenario, illustrated through FIG. 5 and described below, is for explanatory purposes only and not intended to limit the scope disclosed herein.

Hereinafter, consider the following example scenario whereby an organization user, identified as Mark, seeks to not only know more regarding the prospects of quantum computing (QC) development in the technology industry, but also how any derived/inferred insight(s) came to be. To that end, Mark relies on the disclosed capability of insight creation filtering by the Insight Service—embodiments of which have been disclosed herein may be followed by the Insight Service as applied to the circumstances of the example scenario.

Mark begins by submitting a transparent insight query to the Insight Service from his laptop computer (e.g., Client Device), where the transparent insight query includes a query expression posed by the statement "future quantum computing development timeline". The Insight Service extracts expression keyword(s) (e.g., "future", "quantum computing", "development timeline") from the query expression and, based on a metadata graph of an asset catalog maintained thereby and the extracted expression keyword(s), generates a k-partite metadata graph (see e.g., example k-partite metadata graph 500 of FIG. 5 (denoted by the combination of dotted and solid-lined nodes and edges)). After generating the k-partite metadata graph, the Insight Service creates a model input snapshot including the k-partite metadata graph (or a link pointing to a storage location at which the k-partite metadata graph is stored) and an asset catalog version number (e.g., v2.2) associated with the asset catalog.

Thereafter, the Insight Service traverses the k-partite metadata graph using one or more graph theory techniques (e.g., technique A and technique D) to identify an insight-pertinent metadata subgraph (see e.g., example insight-pertinent metadata subgraph 502 of FIG. 5 (denoted by the solid-lined nodes and edges)). The insight-pertinent metadata subgraph, including a respective set of subgraph nodes (denoted by the four (4) solid-lined nodes labeled N4, N5, N7, and N8 in FIG. 5), is/are determined to be the most impactful in/to deriving, or inferring, any insight(s) addressing the query expression.

The Insight Service, next, proceeds to identify an asset catalog subset (e.g., four (4) asset catalog entries) of the asset catalog that respectively map/correspond to the identified set of subgraph nodes. (Individual) asset metadata is subsequently extracted from each of the asset catalog entries, included in the identified asset catalog subset, to obtain an asset metadata corpus including (aggregated) asset metadata. The obtained asset metadata corpus is then analyzed using one or more inference forming algorithms (e.g., algorithm J), thereby producing the insight "4 k qubits by 2025; 1M qubits by 2027" reflecting predicted future milestones for the availability of QC processing power.

Further, based on an examination of the asset metadata corpus, the Insight Service identifies a set of insight-pertinent assets (e.g., a News Article by a News Agency, a Blog Article by author Amy K., a Blog Article by author Gill C., and a Press Release by a Tech Organization) corresponding to the set of subgraph nodes of the insight-pertinent metadata subgraph, and creates a manifest listing the identified set of insight-pertinent assets. Following this, the Insight Service creates a model snapshot specifying the graph theory technique(s) (e.g., technique A and technique D), as well as the inference forming algorithm(s) (e.g., algorithm J), employed in the derivation, or inference, of the produced insight.

The Insight Service, using the insight, the model input snapshot, the manifest listing the set of insight-pertinent assets, and the model snapshot, then creates a non-interactive query result (see e.g., example non-interactive query result 504 of FIG. 5). None of the created non-interactive query result is permitted to be adjusted by Mark. Hereafter, the Insight Service provides the non-interactive query result to Mark in response to the submitted transparent insight query.

While the embodiments disclosed herein have been described with respect to a limited number of embodiments, those skilled in the art, having benefit of this disclosure, will appreciate that other embodiments can be devised which do not depart from the scope disclosed herein as disclosed herein. Accordingly, the scope disclosed herein should be limited only by the attached claims.

What is claimed is:

1. A method for insight creation transparency, the method comprising:
   receiving, at an insight service, a transparent insight query comprising a query expression, wherein the transparent insight query is transmitted by a device of an organization user;
   extracting one or more expression keywords from the query expression;
   obtaining a metadata graph representative of an asset catalog, wherein the metadata graph is a connected graph that maps a data structure configured to maintain asset metadata that describes a collection of assets known to the insight service;
   filtering, based on the one or more expression keywords, the metadata graph to identify a node subset, wherein filtering comprises keyword matching and semantic similarity calculations;
   generating a k-partite metadata graph using the node subset;
   creating a non-interactive query result based on the k-partite metadata graph, wherein creating the non-interactive query result based on the k-partite metadata graph, comprises:
      traversing the k-partite metadata graph to identify an insight-pertinent metadata subgraph;
      identifying, from the asset catalog, an asset catalog subset based on the insight-pertinent metadata subgraph;
      obtaining an asset metadata corpus from the asset catalog subset;
      producing, based on the asset metadata corpus, the insight and the manifest listing a set of insight-pertinent assets; and
      creating the non-interactive query result comprising the insight and the manifest listing the set of insight-pertinent assets,
      wherein the non-interactive query result comprises an insight inferred to address the transparent insight query, a manifest listing providing a set of insight-pertinent assets represents information providing transparency as to how the insight had been produced, a model input snapshot listing inputs used to infer the insight, and a model snapshot revealing a technique used to infer the insight; and
   transmitting the non-interactive query result to the device of the organization user.

2. The method of claim 1, wherein the k-partite metadata graph is traversed using at least one graph theory technique, and wherein creating the non-interactive query result based on the k-partite metadata graph, further comprises:
prior to creating the non-interactive query result:
creating the model snapshot comprising the at least one graph theory technique.

3. The method of claim 2, wherein the insight is produced through analysis of the asset metadata corpus using at least one inference forming algorithm, and wherein the model snapshot further comprises the at least one inference forming algorithm.

4. The method of claim 2, wherein creating the non-interactive query result based on the k-partite metadata graph, further comprises:
prior to creating the non-interactive query result:
creating the model input snapshot comprising the k-partite metadata graph and an asset catalog version associated with the asset catalog.

5. The method of claim 1, wherein identifying, from the asset catalog, the asset catalog subset based on the insight-pertinent metadata subgraph, comprises:
identifying a set of subgraph nodes forming the insight-pertinent metadata subgraph; and
for each subgraph node in the set of subgraph nodes, and to identify a set of asset catalog entries:
mapping the subgraph node to an asset catalog entry of the asset catalog,
wherein the set of asset catalog entries comprises the asset catalog entry,
wherein the asset catalog subset comprises the set of asset catalog entries.

6. The method of claim 5, wherein obtaining the asset metadata corpus from the asset catalog subset, comprises:
for each asset catalog entry in the set of asset catalog entries included in the asset catalog subset:
extracting individual asset metadata from the asset catalog entry, wherein the asset metadata corpus comprises aggregated asset metadata comprising the individual asset metadata extracted from across the asset catalog subset.

7. The method of claim 6, wherein producing the manifest listing the set of insight-pertinent assets based on the asset metadata corpus, comprises:
for each individual asset metadata included in the asset metadata corpus:
examining at least a portion of the individual asset metadata to identify an insight-pertinent asset in the set of insight-pertinent assets,
wherein the individual asset metadata describes the insight-pertinent asset.

8. The method of claim 1, wherein a second expression keyword is extracted from the query expression, and the method further comprises:
prior to generating the k-partite metadata graph:
filtering, based on the second expression keyword, the metadata graph to identify a second node subset,
wherein the k-partite metadata graph is generated further using the second node subset.

9. A non-transitory computer readable medium (CRM) comprising computer readable program code, which when executed by a computer processor, enables the computer processor to perform a method for insight creation transparency, the method comprising:
receiving, at an insight service, a transparent insight query comprising a query expression, wherein the transparent insight query is transmitted by a device of an organization user;
extracting one or more expression keywords from the query expression;
obtaining a metadata graph representative of an asset catalog, wherein the metadata graph is a connected graph that maps a data structure configured to maintain asset metadata that describes a collection of assets known to the insight service;
filtering, based on the one or more expression keywords, the metadata graph to identify a node subset, wherein filtering comprises keyword matching and semantic similarity calculations;
generating a k-partite metadata graph using the node subset;
creating a non-interactive query result based on the k-partite metadata graph, wherein creating the non-interactive query result based on the k-partite metadata graph, comprises:
traversing the k-partite metadata graph to identify an insight-pertinent metadata subgraph;
identifying, from the asset catalog, an asset catalog subset based on the insight-pertinent metadata subgraph;
obtaining an asset metadata corpus from the asset catalog subset;
producing, based on the asset metadata corpus, the insight and the manifest listing a set of insight-pertinent assets; and
creating the non-interactive query result comprising the insight and the manifest listing the set of insight-pertinent assets,
wherein the non-interactive query result comprises an insight inferred to address the transparent insight query, a manifest listing providing a set of insight-pertinent assets represents information providing transparency as to how the insight had been produced, a model input snapshot listing inputs used to infer the insight, and
a model snapshot revealing a technique used to infer the insight; and
transmitting the non-interactive query result to the device of the organization user.

10. The non-transitory CRM of claim 9, wherein the k-partite metadata graph is traversed using at least one graph theory technique, and wherein creating the non-interactive query result based on the k-partite metadata graph, further comprises:
prior to creating the non-interactive query result:
creating the model snapshot comprising the at least one graph theory technique.

11. The non-transitory CRM of claim 10, wherein the insight is produced through analysis of the asset metadata corpus using at least one inference forming algorithm, and wherein the model snapshot further comprises the at least one inference forming algorithm.

12. The non-transitory CRM of claim 10, wherein creating the non-interactive query result based on the k-partite metadata graph, further comprises:
prior to creating the non-interactive query result:
creating the model input snapshot comprising the k-partite metadata graph and an asset catalog version associated with the asset catalog.

13. The non-transitory CRM of claim 9, wherein a second expression keyword is extracted from the query expression, and the method further comprises:

prior to generating the k-partite metadata graph:
filtering, based on the second expression keyword, the metadata graph to identify a second node subset,
wherein the k-partite metadata graph is generated further using the second node subset.

14. A system, the system comprising:

a client device of an organization user; and an insight service operatively connected to the client device, and comprising a computer processor configured to perform a method for insight creation transparency, the method comprising:

receiving, from the client device, a transparent insight query comprising a query expression;

extracting one or more expression keywords from the query expression;

obtaining a metadata graph representative of an asset catalog, wherein the metadata graph is a connected graph that maps a data structure configured to maintain asset metadata that describes a collection of assets known to the insight service;

filtering, based on the one or more expression keywords, the metadata graph to identify a node subset, wherein filtering comprises keyword matching and semantic similarity calculations;

generating a k-partite metadata graph using the node subset;

creating a non-interactive query result based on the k-partite metadata graph, wherein creating the non-interactive query result based on the k-partite metadata graph, comprises:

traversing the k-partite metadata graph to identify an insight-pertinent metadata subgraph;

identifying, from the asset catalog, an asset catalog subset based on the insight-pertinent metadata subgraph;

obtaining an asset metadata corpus from the asset catalog subset;

producing, based on the asset metadata corpus, the insight and the manifest listing a set of insight-pertinent assets; and creating the non-interactive query result comprising the insight and the manifest listing the set of insight-pertinent assets, wherein the non-interactive query result comprises an insight inferred to address the transparent insight query, a manifest listing providing a set of insight-pertinent assets represents information providing transparency as to how the insight had been produced, a model input snapshot listing inputs used to infer the insight, and a model snapshot revealing a technique used to infer the insight; and transmitting the non-interactive query result to the device of the organization user.

* * * * *